United States Patent [19]

Sherbondy

[11] Patent Number: 4,922,644
[45] Date of Patent: May 8, 1990

[54] FISHING LINE SPOOL HOLDER

[76] Inventor: Donald C. Sherbondy, P.O. Box 5944, Denver, Colo. 80202

[21] Appl. No.: 212,176

[22] Filed: Aug. 22, 1988

[51] Int. Cl.⁵ .................... A01K 89/00; B65H 17/52
[52] U.S. Cl. ........................ 43/25; 43/54.1; 242/106
[58] Field of Search ............ 43/25; 242/106, 55.2, 242/129.71, 239.51, 84.5 R

[56] References Cited

U.S. PATENT DOCUMENTS

| | | | |
|---|---|---|---|
| 2,993,661 | 7/1961 | D'Arrigo | 242/106 |
| 3,026,059 | 3/1962 | Dennler | 242/106 |
| 3,295,787 | 1/1967 | Golonka | 242/106 |
| 3,402,501 | 9/1968 | Davis | 43/54.1 |
| 3,685,761 | 8/1972 | Zelinski | 242/84.5 R |
| 3,776,485 | 12/1973 | Foley | 242/106 |
| 3,799,471 | 3/1974 | Morris | 242/106 |
| 3,950,881 | 4/1976 | Hays | 242/129.51 |
| 3,951,354 | 4/1976 | Bagby | 242/106 |
| 3,973,741 | 8/1976 | Dean | 242/106 |
| 4,034,930 | 7/1977 | Stevenson | 242/106 |
| 4,151,966 | 5/1979 | Lindsay | 242/106 |
| 4,715,554 | 12/1987 | Kuntze | 43/25 |
| 4,776,527 | 10/1988 | Prowat | 43/25 |

Primary Examiner—Kurt Rowa

[57] ABSTRACT

An apparatus which clips easily to a fishing rod for supporting a storage spool of new fishing line, while transferring the line to a fishing reel is provided for all forms of fishing rods to reload all forms of reels from all forms of storage spools. The apparatus or holder operates in such a manner that line kinking and twisting are eliminated through proper tension and line removal direction.

2 Claims, 1 Drawing Sheet

FISHING LINE SPOOL HOLDER

FIELD OF THE INVENTION

The present invention relates to the field of fishing as a holder to aid in the transfer of new fishing from its storage spool to a fishing reel, while the reel and the holder are attached to the fishing rod.

Prior art shows that several holders have been created and although each is unique in design, there are noticeable deficiencies or complications that limit their field of use. Most of the holders created are capable of transferring line and are portable; however, they are bulky and generally quite complicated to use. Smaller and less complicated holders have been created and, accordingly, the holders are unable to provide proper tension, or they are restricted to storage spool size, or they cannot be received by all forms of fishing rods. Those holders of more mechanical operation are also subject to easily lost parts.

Common problems that confront most all fishermen when manually transferring new fishing line to a fishing reel, especially while outdoors, are kinking in the line, caused by improper tension or twisting in the line, produced by improper rotation of the storage spool as the line is received by the fishing reel. It is important that the storage spool rotate in the proper direction when transferring line, as spinning type reels receive line around their axis perpendicular to the storage reel, therefore the storage spool must turn in a clockwise manner; this places the new line on the axis of the reel in the same manner that the line was stored on the storage spool, eliminating any twist in the line.

Casting reels receive line around their axis in the exact manner as the new line storage spool and therefore the storage spool must rotate in a counter clockwise direction, which in turn is the same rotation of the receiving reel.

The present invention addresses and operates in a manner that resolves the aforementioned problems by providing means for simple use while eliminating kinks through proper tension, and resolving twists through proper spool rotation. The holder is extremely compact for a tackle box and a fishing vest, and has no misplaceable parts.

SUMMARY OF THE INVENTION

The present invention provides a holder able to support storage spools of new fishing line, while the line is being transferred to a fishing reel. The holder is in the form of a molded solid lightweight plastic; its design consisting of a long flat narrow structure or arm, at one end of the arm a rise or ridge, directly in the center of the ridge a hole or eyelet provided as a guide for fishing line to pass through as it is removed from the storage spool, at the opposite end of the arm's eyelet a base that is wider than the rest of the arm and more rectangular in size; the base will support any size storage spool. Located directly in the center of the base, a tapered cylindrical protrusion or stud, said stud available to receive the cylindrical axis of a storage spool to rotate around. Directly under the stud, on the bottom side of the base and permanently attached to the holder is a semi-cylindrical clip with opposing sides, its length equal to that of the base, its height and width half that of the length. The clip with opposing sides provides a firm grip around a fishing rod, the holder is affixed to the rod where the taper is less in size than that of the clip's opening. As the holder is moved up towards the larger area of taper, the grip is defined, enabling the holder to set firmly to the rod and support a storage spool in the proper manner for transferring the line to the fishing reel. The holder's design allows it to turn 360° around the rod so that any storage spool can be aligned properly to any receiving reel.

All of the objectives of the aforementioned holder are achieved when the holder is clipped in place firmly on the rod, the eyelet end of the arm pointing in the direction of the reel to be loaded, the new spool of line is placed on the holder, its axis centered on the stud, the line is threaded through the eyelet and to the reel. Proper tension is achieved when the line is drawn between two fingers as the reel is turned in a retrieving manner; also the weight of larger storage spools will create their own tension avoiding kinks in the line. The elimination of twists in the line have been achieved through proper rotation of the storage spool as the line is being transferred. This is an extremely compact and easy-to-use holder; when made in different sizes, it is capable of being used on any size fishing rod and with every form of fishing reel, using any size storage spool.

DETAILED DESCRIPTION OF THE INVENTION

Figure 1:
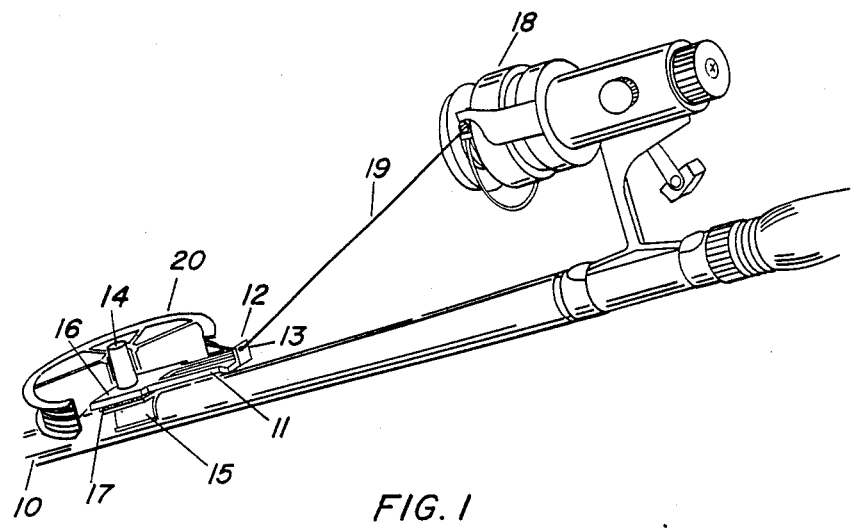
FIG. 1 is a perspective isometric top and side elevational view of the reel and invention mounted on a fishing rod, and a fragmentary spool of line set a top the holder.
Figure 2:
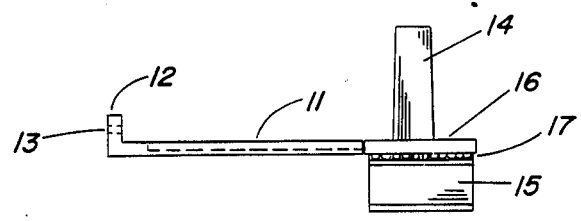
FIG. 2 is a side elevational view of the spool holder only.
Figure 3:
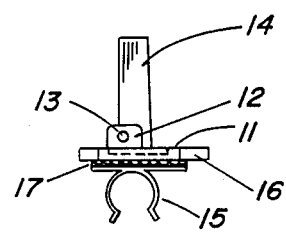
FIg. 3 is a front elevational view of the invention.
Figure 4:
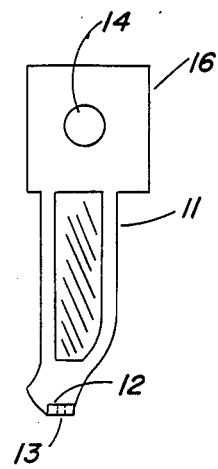
FIg. 4 is a top view of the invention.

The present invention provides a convenient and desired means of transferring new fishing line to a reel. The holder shown in FIGS. 1-4 is referred to by the number 11, and is shown in its proper placement on a fishing rod 10 in FIG. 1. The holder 11 is basically a two component structure, the holder 11 and a clip 15, that is permanently attached to the base 16 of the holder 11. The holder 11 is a long flat arm with an upright turn at one end referred to as a ridge 12, centered in the middle of the ridge 12 is a hole 13, the ridge 12 and the hole 13 together are referred to as a guide. The guide 12 and 13 are provided for fishing line 19, as shown in FIG. 1, to pass through. The guide 12 and 13 keeps the line 19 in place during transfer.

At the opposite end of the holder 11, across from guide 12 and 13, is a wide rectangular base 16, centered in the field of the base 16 is a cylindrical tapered protrusion referred to as a stud 14. The stud 14 is provided for the axis of a storage spool 20 to rotate around, as the spool 20 rests on the base 16 of the holder 11.

The clip 15 has double sided adhesive backing 17 which permanently bonds the clip 15 to the holder 11. The sides of the clip 15 grip tightly around the rod 10 to keep the holder 11 firmly in place. When the clip 15 is rotated one quarter of a turn on the rod 10, the storage spool 20 becomes parallel in rotation to the rod 10 in order to accommodate casting reels; this method may also be used for spinning reels 18, providing the spool 20 is in proper rotation.

It is the purpose of the present holder 11 to provide a simple and unique means of transferring the fishing line 19 to the reel 18 while mounted to the rod 10; the user is instructed to let the line 19 pass between two fingers while transferring, this lets the user create a perfect tension on the line 19 which avoids kinks in the line 19.

The simplicity and compactness of this invention makes it a more desirable aid for transferring line while avoiding having parts that are easily lost or being too mechanical to operate, but extremely universal for all types of fishing rods, fishing reels and new line storage spools, therefore the following claims for this invention are made.

Having described the invention, I claim:

1. A fishing line spool holder to support a fishing line storage spool while line is transferred to a fishing reel while both the spool holder and reel are attached to a fishing rod, said spool holder comprising, a base with a centrally located tapered cylindrical stud for mounting a line storage spool, an arm extending from the base, said arm having a ridge mounted transversely to the arm and parallel to said tapered cylindrical stud, said ridge having a central hole large enough in diameter for a fishing line, a clip mounted to the opposite side of the base from said stud for mounting to a fishing rod.

2. A holder is described in claim 1, wherein the holder has means of attachment and detachment further defined, comprising a clip, said clip usually the length of said base of the holder, said clip having two extroverted semi-curved opposing walls protruding outwardly from a flat base, said base of clip having a strong adhesive pad, said pad having said adhesive on two sides, therefore abutting said base of said clip permanently to the base of the holder, said semi-curved walls able to hug the diameter of a fishing rod, an opening between said walls and the full length of said clip wherein said fishing rod may enter into said clip, said clip now semi-encircled around said fishing rod thereby attaching the holder firmly to said rod.

* * * * *